US012366328B2

(12) United States Patent
Stubenrauch

(10) Patent No.: US 12,366,328 B2
(45) Date of Patent: Jul. 22, 2025

(54) CRYOGENIC STORAGE SYSTEM

(71) Applicant: MAGNA STEYR Fahrzeugtechnik AG & Co KG, Graz (AT)

(72) Inventor: Martin Stubenrauch, Wundschuh (AT)

(*) Notice: Subject to any disclaimer, the term of this patent is extended or adjusted under 35 U.S.C. 154(b) by 320 days.

(21) Appl. No.: 17/935,290

(22) Filed: Sep. 26, 2022

(65) Prior Publication Data
US 2023/0089359 A1 Mar. 23, 2023

(30) Foreign Application Priority Data

Sep. 23, 2021 (DE) .......................... 102021210616.1

(51) Int. Cl.
*F17C 3/08* (2006.01)

(52) U.S. Cl.
CPC ........ *F17C 3/08* (2013.01); *F17C 2203/0391* (2013.01); *F17C 2203/0629* (2013.01); *F17C 2205/0326* (2013.01); *F17C 2205/0352* (2013.01); *F17C 2221/012* (2013.01); *F17C 2223/0161* (2013.01); *F17C 2227/0302* (2013.01)

(58) Field of Classification Search
CPC ................ F17C 3/08; F17C 2203/0391; F17C 2203/0629; F17C 2205/0326; F17C 2205/0352; F17C 2205/0361
USPC .................................................. 220/560.12
See application file for complete search history.

(56) References Cited

U.S. PATENT DOCUMENTS

| | | | | |
|---|---|---|---|---|
| 5,806,470 A | * | 9/1998 | Konishi | ............... F28F 13/06 122/367.3 |
| 2008/0134693 A1 | * | 6/2008 | Harper | ................. F17C 1/12 62/50.7 |

(Continued)

FOREIGN PATENT DOCUMENTS

| DE | 102004011653 A1 | 9/2005 |
|---|---|---|
| DE | 19645488 C5 | 8/2012 |

(Continued)

OTHER PUBLICATIONS

German Search Report for Application No. 102021210616.1, mailed Jun. 23, 2022, 5 pages.

(Continued)

*Primary Examiner* — Orlando E Aviles
*Assistant Examiner* — Niki M Eloshway
(74) *Attorney, Agent, or Firm* — Jordan IP Law, LLC; Todd A. Vaughn

(57) ABSTRACT

A storage system for storing a cryogenic medium, in particular, for storing hydrogen. The storage system includes storage container for receiving the cryogenic medium, at least one pipe projecting from outside the storage container into the storage container, and a shut-off valve in fluidic communication with the at least one pipe. The at least one pipe is closed at an end thereof facing away from the storage container and is open at another end thereof located in the storage container. The shut-off valve is moveable between an open operating state in which an inner space of the at least one pipe is in fluidic communication with an inner space of (Continued)

the storage container, and a closed operating state in which the inner space of the at least pipe is not in fluidic communication with the inner space of the storage container.

20 Claims, 8 Drawing Sheets

(56) References Cited

U.S. PATENT DOCUMENTS

| | | | | |
|---|---|---|---|---|
| 2010/0236284 A1* | 9/2010 | DuBrucq | ................ | F17C 13/00 |
| | | | | 62/611 |
| 2018/0128210 A1* | 5/2018 | Garner | ................... | F02M 21/06 |
| 2020/0378556 A1* | 12/2020 | Wowk | ....................... | F17C 1/12 |
| 2021/0372570 A1* | 12/2021 | Stubenrauch | ............. | F17C 3/00 |
| 2022/0146047 A1* | 5/2022 | Bensadoun | ............. | F17C 5/007 |

FOREIGN PATENT DOCUMENTS

| | | |
|---|---|---|
| DE | 102020206689 B3 | 8/2021 |
| EP | 1180637 A2 | 2/2002 |

OTHER PUBLICATIONS

European Search Report for Application No. 22194030, mailed Feb. 8, 2023, 4 pages.

\* cited by examiner

CRYOGENIC STORAGE SYSTEM

CROSS-REFERENCE TO RELATED APPLICATIONS

The present application claims priority 35 U.S.C. § 119 to German Patent Publication No. DE 102021210616.1 (filed on Sep. 23, 2021), which is hereby incorporated by reference in its entirety.

TECHNICAL FIELD

Embodiments relate to a storage system for storing a cryogenic medium, in particular for storing hydrogen.

BACKGROUND

It is known that cryogenic media, that is to say, intensely refrigerated and at least partially liquid media, such as hydrogen or helium, can be kept in a storage container in order to transport energy, for example, for driving a vehicle, a ship, an aircraft or a rocket. In this case, the medium is usually present in the storage container partially in liquid form and partially also in gas form.

In cryogenic storage systems, during operation a pressure production system which compensates for the pressure decrease generated during the gaseous or fluid removal of, for example, hydrogen is necessary. This is generally ensured either by an in-tank heat exchanger (closed pipeline system) or by direct vaporisation (open system). For this type of pressure production, on the one hand, a removal of hydrogen is necessary and, on the other hand, a heat source (generally waste heat of the consumer) is also necessary. If no hydrogen is removed and if a higher pressure level is nevertheless intended to be reached, this is possible via electric heaters, so-called blowers, or with cryogenic liquid pumps.

Modern mobile liquid hydrogen storage applications require pressure production systems which, on the one hand, allow a pressure production without removing hydrogen and, on the other hand, take up little structural space, have little weight and have a small electrical energy requirement. Electrical heaters, blowers and pumps cannot carry this out or can only carry it out partially, with a high level of technical complexity or high electrical energy requirement, which constitutes a great disadvantage for mobile applications.

SUMMARY

Embodiments relate to a cryogenic storage system which allows a pressure production without removing hydrogen in a technically simple and cost-effective manner.

In accordance with embodiments, a storage system for storing a cryogenic medium, in particular for storing hydrogen, comprises a storage container for receiving the medium, wherein at least one pipe projects from outside the storage container into the storage container, wherein the pipe is closed at the end thereof facing away from the storage container and is open at the end thereof located in the storage container, wherein a shut-off valve is arranged on the pipe at a specific position so that the inner space of the pipe is connected to the inner space of the storage container in a fluid-conducting manner when the shut-off valve is opened and the inner space of the pipe is not connected to the inner space of the storage container in a fluid-conducting manner when the shut-off valve is closed.

In accordance with embodiments, consequently, a storage system, that is to say, tank, is constructed to store a cryogenic medium so that a preferably thin pipeline projects from outside into the tank—preferably into the liquid in the tank—wherein the pipeline is closed externally and the pipeline has an open end inside the tank and the cryogenic medium can thereby come into contact with the pipe inner space.

The pipeline has a shut-off valve, wherein via the shut-off valve the pressure in the tank can be regulated/controlled or the pressure in the tank is increased when the valve is opened. The shut-off valve can preferably be controlled, in particular can be opened and closed, by a control device.

The pipe is configured to form thermo-acoustic oscillations so that, in the event of connection to a cryogenic medium, a pressure production based on the thermo-acoustic effect is brought about inside the pipe.

An increase of the pressure in the tank can thereby be carried out without, as is otherwise usual, thermal energy having to be supplied to the tank by additional heaters.

A thermo-acoustic pressure production system makes use of the effect of the thermo-acoustic oscillations (TAO) in order to increase the pressure in the tank system. In this case, the gas which is in the pipeline is caused to oscillate as a result of thermal transport from the pipeline wall into the gas.

Thermo-acoustic oscillations must absolutely be avoided for a long storage duration of cryogenic media, particularly hydrogen and helium, but can be used in the present case of desired pressure production.

The components are preferably limited in this case to a shut-off valve and a thin pipeline which preferably provides at the warm side a sufficiently large heat transfer area, for example, by forming pipe ribs. At the warm end, that is to say, outside the storage container, the pipeline is closed. The pipe is preferably completely closed outside the storage container.

Preferably, therefore, the pipe is constructed at the end thereof facing away from the storage container, that is to say, at the warm side, for improved heat transfer, preferably by at least one heat transfer area, for example, by pipe ribs.

At the end of the pipe facing away from the storage container, according to one embodiment a heat transmitter is arranged in order to transmit heat to the pipe, in particular heat from passing air and/or from a cooling fluid.

In this case, the cold open end of the pipeline is located in the cryogenic fluid in the case of a full storage container. The pipeline of the preferably vacuum-insulated container leads through the vacuum space as far as the warm side, that is to say, outer side of the container. The position of the shut-off valve of the pipeline is preferably either in the vacuum region or barely at the warm side of the container. The function of the shut-off valve is to selectively suppress thermo-acoustic oscillations which are undesirable in the rest state of the container.

In an ideal configuration of the system, thermo-acoustic resonance which allows a pressure production within an extremely short time is produced. It is significant for the function that there is a corresponding temperature gradient of the warm end and the cold end of the pipeline. Preferably, the ambient temperature forms the warm end and the cold end is cooled by a low-boiling fluid in the storage container, such as hydrogen or helium.

Preferably, the storage container is constructed with double walls, with an insulating vacuum space between the two walls of the storage container, wherein the end, facing away from the storage container, of the pipe is located outside the insulating vacuum space and the pipe extends through the vacuum space and opens in the storage container.

Furthermore, the ratio of the pipe length to the pipe diameter and the wall thickness of the pipe are also significant. In this case, the pipe must be as long as possible and as thin as possible and the wall thickness must be as small as possible.

The internal diameter of the pipe is therefore small over the entire pipe length or at least outside the storage container, that is to say, at the warm end, preferably a maximum of 20 mm or a maximum of 10 mm, particularly preferably a maximum of 6 mm.

The pipe preferably has a length of at least 50 mm outside the storage container, preferably at least 100 mm, particularly preferably at least 200 mm.

The pipe preferably has a length of at least 500 mm inside the storage container, preferably at least 1000 mm, particularly preferably at least 2000 mm.

The pipe preferably has a wall thickness of a maximum of 3 mm, preferably a maximum of 2 mm, particularly preferably a maximum of 1 mm.

The ratio of the total length to the internal diameter of the pipe is preferably at least 100:1, preferably at least 400:1, particularly preferably at least 800:1.

A thermo-acoustic pressure production system can be used as a single pressure production system and in order to supplement conventional pressure production systems.

In order to increase the power of the system, a plurality of pipelines which are particularly arranged in a parallel manner can be used.

Therefore, the storage system preferably has a plurality of such pipes which project from outside the storage container into the storage container, wherein an individual shut-off valve is arranged on each pipe or at least two pipes, preferably all the pipes, can be opened and closed via shut-off valves in a common valve block. If a plurality of pipelines are used in parallel, that is to say, the power of the system is multiplied by a parallel arrangement, they can consequently be closed or opened via individual valves or a large "valve block."

In order to further increase the power of the system, heat can further be introduced at the warm side of the line via a heat transmitter. This heat can be supplied, for example, from the passing air or from the waste heat of the consumer via cooling fluid.

In order to protect the line(s) in the case of the rest state even more effectively from radiation heat from the exterior, they can be wrapped with an insulation or radiation shields, for example, multiple-layer insulation (MLI). Depending on the variant, the whole of or only a portion of the line length is then insulated in the vacuum space. The pipe can consequently be constructed in a thermally insulated manner via a pipe portion in the vacuum space.

For further reinforcing the thermo-acoustic effect, the geometry of the pipe end can be adapted in the internal tank, for example, a reduction of the open cross section of the line or a continuous tapering of the pipe end. The pipe therefore preferably has over a pipe portion inside the storage container a smaller internal diameter than over a pipe portion outside the storage container, in particular a reduced internal diameter or a continuous tapering towards the end of the pipe in the storage container.

A thermo-acoustic pressure production system as described above can also be used in addition to pressure production systems according to the state of the art.

The operation of an apparatus according to the invention is: in the rest state, the valve located in the line is closed in order to prevent thermo-acoustic oscillations. If a pressure production is desired, the valve is opened, a long pipe portion which is subjected to the ambient temperature is released and consequently the critical length-to-diameter ratio is exceeded. The gas which is in the pipe begins to expand as a result of the thermal transport via the pipe wall and to contract again, that is to say, to oscillate, discharges gas at the pipe end which is located in the fluid with each oscillation and draws fluid, which subsequently at least partially vaporises in the pipe, in again. The effect is thereby repeated or it is further amplified. Ideally, resonance is produced in an extremely short time, whereby heat is continuously introduced into the system.

DRAWINGS

Embodiments will be illustrated by way of example in the drawings and explained in the description hereinbelow.

DESCRIPTION

Figure 1:
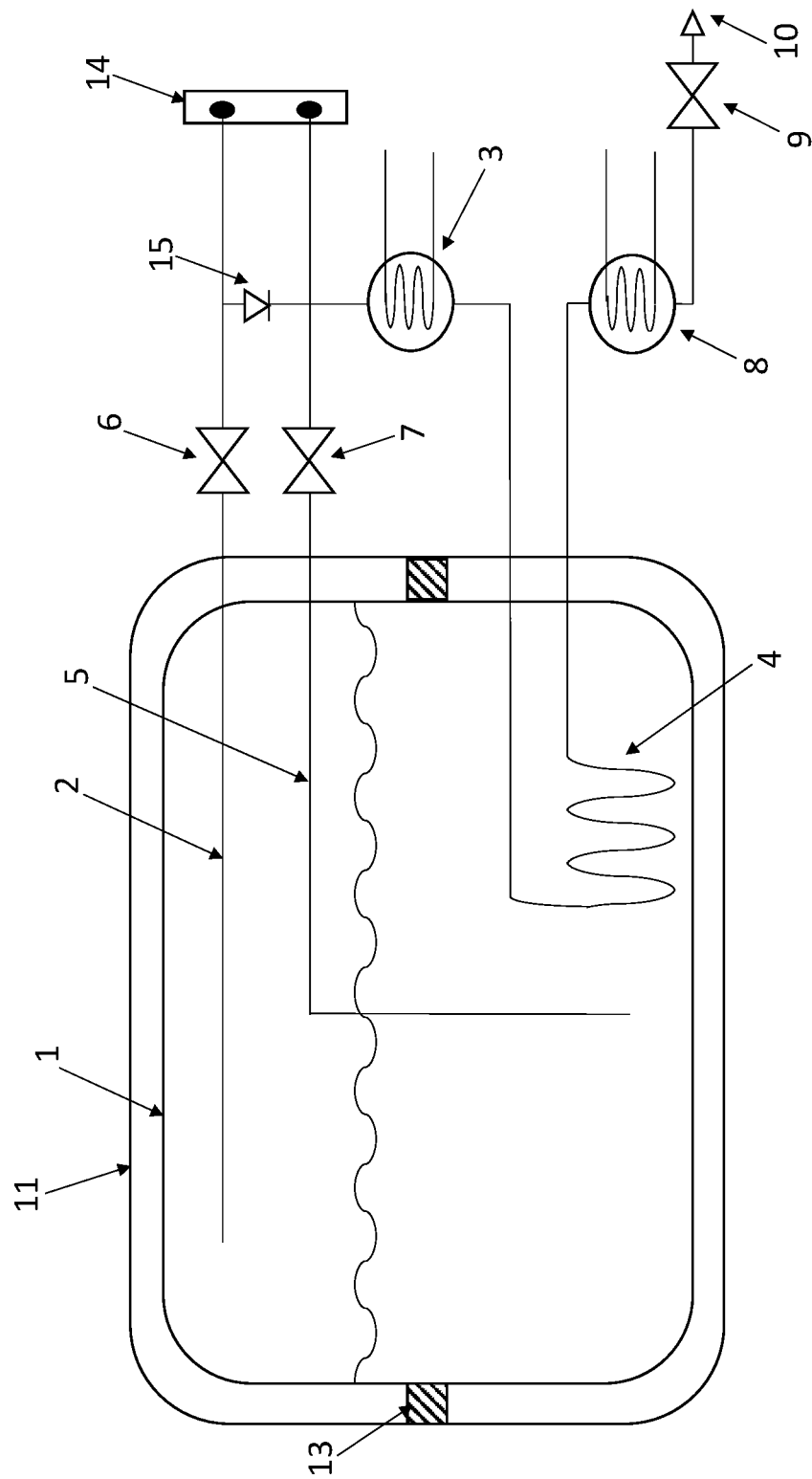
FIG. 1 illustrates a schematic of a storage system not according to the invention.

FIG. 1 shows a storage system not according to the invention for storing a cryogenic medium, in particular, for storing hydrogen.

The storage system comprises a storage container 1 for receiving the medium. The storage container 1 forms an inner container of a double-walled container, which additionally comprises an outer container 11. A vacuum is formed between the outer container 11 and the inner container, that is to say, the storage container 1. Mountings 13 are additionally arranged in some regions between the outer container 11 and the inner container in order to position the two shells of the double-walled container relative to one another.

In the lower region of the storage container 1, that is, below the liquid surface, which is shown as a wavy line in the Figure, the cryogenic medium, in particular hydrogen, is present in the container in the form of a liquid, above the wavy liquid surface it is present in the gaseous state.

A gas removal line 2 is configured to remove the gaseous medium from the storage container 1 so that the free end of the gas removal line 2 ends in the storage container 1 above the liquid surface, in the vicinity of the roof of the storage container 1.

A liquid removal line 5 is adapted to remove the liquid medium from the storage container 1 so that the free end of the liquid removal line 5 ends in the storage container 1 below the liquid surface, in the vicinity of the base of the storage container 1.

In this case, the terms "roof" and "base" thereby refer to the usual installation position of the storage container, for example, in a driving, floating or flying transport apparatus, gravitational force acting in the direction towards the bottom of the storage container during normal operation of the transport apparatus.

A first controllable line shut-off valve 6 is arranged in the gas removal line 2, and a second controllable line shut-off valve 7 is arranged in the liquid removal line 5. Both line shut-off valves are located outside the storage container 1. In FIG. 1, the line shut-off valves are also located outside the outer container 11.

Figure 2:
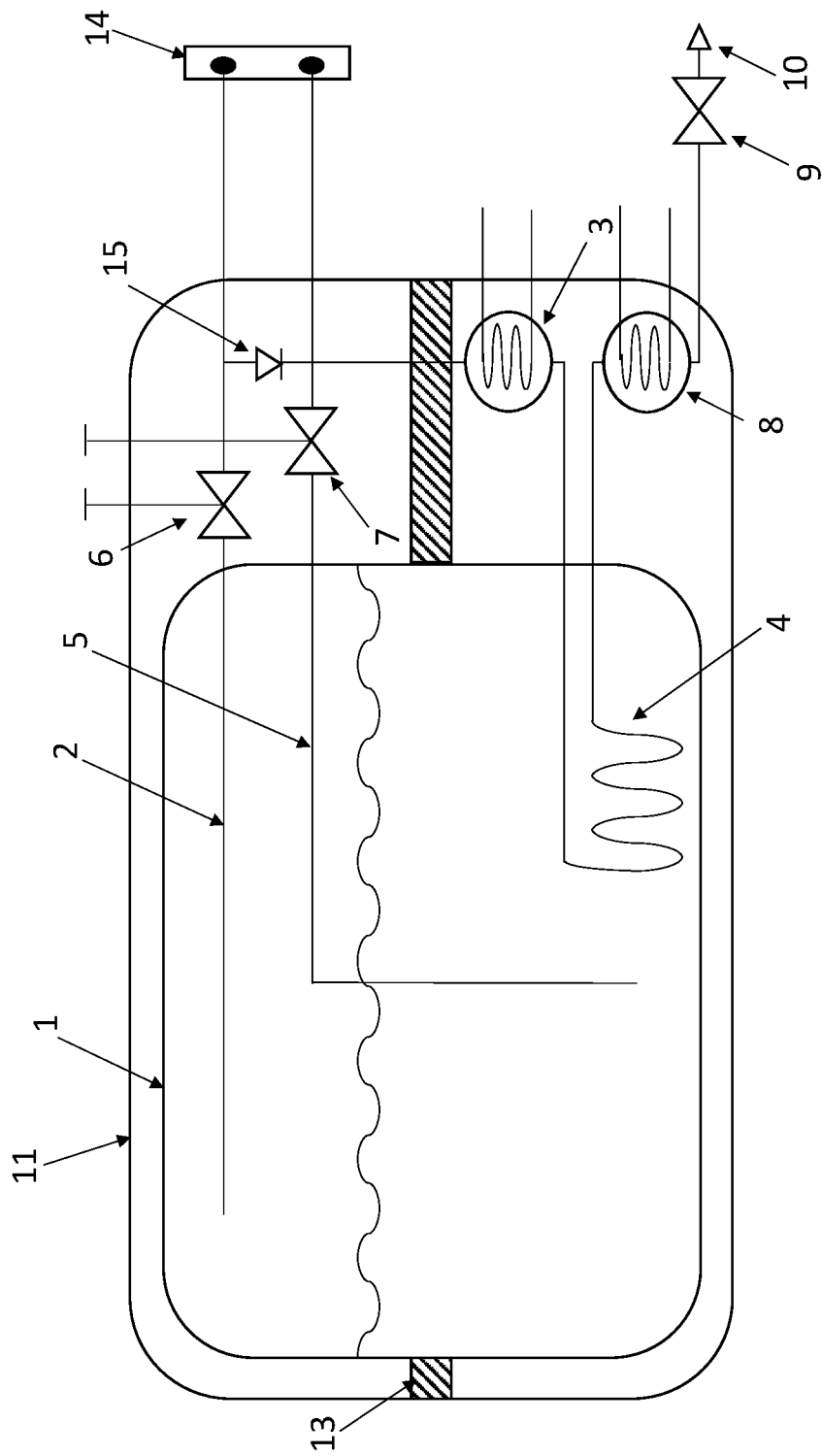
FIG. 2 illustrates a schematic of an alternative embodiment of a storage system not according to the invention.

In the alternative embodiment of the storage system which is shown in FIG. 2, the two line shut-off valves are arranged inside the outer container 11, that is to say, between the inner container, the storage container 1 and the outer container of the double-walled storage container, in particular in the vacuum space.

The line shut-off valves are controllable by a control apparatus, which is also arranged in the vacuum space (FIG. 2) or outside the container as a whole (FIG. 1). In this case, the flow through the line shut-off valves can preferably not only be interrupted or enabled but also reduced.

Refuelling of the storage container 1 from a refuelling apparatus 14 can also take place via the gas removal line 2 and/or the liquid removal line 5, preferably also via the first line shut-off valve 6 and/or the second line shut-off valve 7.

The gas removal line 2 and the liquid removal line 5 are brought together after the two line shut-off valves 6, 7 to form a common line. A rectifying valve, in particular a non-return valve 15, can be arranged in the gas removal line 2 so that only the direction of flow from the first line shut-off valve 6 to the first heat exchanger 3 is permitted, the opposite direction is blocked.

The gas removal line 2 and the liquid removal line 5, in the form of the common line, are fluidically connected to the first heat exchanger 3, which is arranged outside the storage container 1, for example, between the storage container 1 and the outer container 11 of the double-walled storage container (FIG. 2), for heating the medium which has been removed.

An in-tank heat exchanger 4 for heating the liquid medium in the storage container 1 is arranged downstream of the first heat exchanger 3 inside the storage container 1, the heated medium removed from the storage container 1 flowing through the in-tank heat exchanger 4. As a result of the heating at the in-tank heat exchanger 4, the liquid medium in the storage container 1 is partially heated and vaporised.

There is no controllable three-way valve arranged in the gas removal line 2 and in the liquid removal line 5 so that all the medium which is removed through the gas removal line 2 and/or through the liquid removal line 5 and which is heated by the first heat exchanger 3 reaches the in-tank heat exchanger 4.

Since the pressure in the storage container 1 is regulated via the first and second line shut-off valve 6, 7, a controllable three-way valve is not required.

A control unit of the storage system is configured to control the pressure in the storage container 1 upon removal of the medium in that the control unit selectively opens the first line shut-off valve 6 and/or the second line shut-off valve 7 so that the medium is removed from the storage container 1 selectively via the gas removal line 2 and/or via the liquid removal line 5.

A second heat exchanger 8 for heating the medium is arranged downstream of the in-tank heat exchanger 4 and outside the storage container 1, outside (FIG. 1) or inside (FIG. 2) the outer container 11 of the double-walled container.

The medium removed via the gas removal line 2 and/or the liquid removal line 5 is fed downstream of the in-tank heat exchanger 4 to a consumer 10, in particular to a fuel cell. A third line shut-off valve 9 is arranged between the second heat exchanger 8 and the consumer 10.

The embodiment of FIG. 2 differs from FIG. 1 in that components, which are relevant for control, of the storage system, such as the first heat exchanger 3, the second heat exchanger 8, the first line shut-off valve 6 and the second line shut-off valve 8, and the non-return valve 15, are arranged inside the outer container 11, not outside the outer container 11 as in FIG. 1, and are thus arranged in the intermediate space of the double-walled container which forms a vacuum space.

Figure 3:
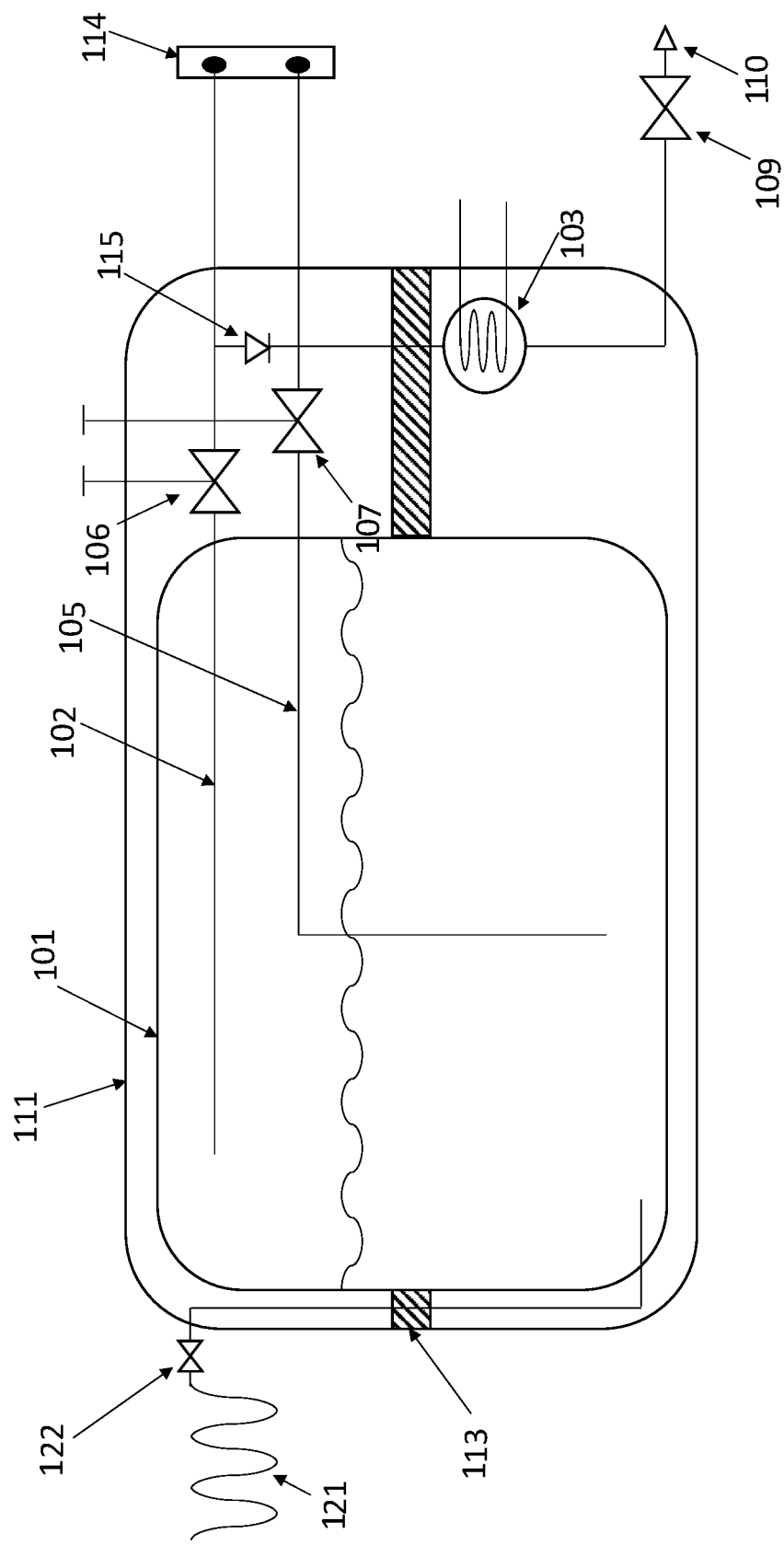
FIG. 3 illustrates a schematic of a storage system, in accordance with embodiments.

FIG. 3 illustrates a storage system according to the invention for storing a cryogenic medium, in particular for storing hydrogen.

The storage system according to the invention comprises a pipe 121 which projects from outside the storage container 101 into the storage container 101, wherein the pipe 121 is closed at the end thereof facing away from the storage container 101 and is open at the end thereof located in the storage container 101, wherein a shut-off valve 122 is arranged on the pipe 121 so that the inner space of the pipe 121 is connected in a fluid-conducting manner to the inner space of the storage container 101 when the shut-off valve 122 is opened and the inner space of the pipe 121 is not connected in a fluid-conducting manner to the inner space of the storage container 101 when the shut-off valve 122 is closed.

The storage system does not have any in-tank heat exchanger 104 for heating the fluid medium in the storage container 101.

The pipe 121 is configured to form thermo-acoustic oscillations so that a thermo-acoustic pressure production inside the pipe 121 is carried out in the event of connection to a cryogenic medium in the storage container 101 with the shut-off valve 122 open.

The storage container 101 is constructed with double walls, with an insulating vacuum space between the two walls 101, 111 of the storage container 101, wherein the end, facing away from the storage container 101, of the pipe 121 is located outside the insulating vacuum space and the end, located in the storage container 101, of the pipe 121 is located inside the insulating vacuum space or the pipe extends through the vacuum space and opens in the storage container 101.

The pipe 121 may have a suitable geometry in order to accommodate a desired pipe length in a relatively small structural space, for example, a meandering or helical form.

The shut-off valve 122 of the pipe 121 is arranged in FIG. 3 outside the storage container 101 and outside the vacuum space, that is to say, outside the outer container 111.

Figure 4:
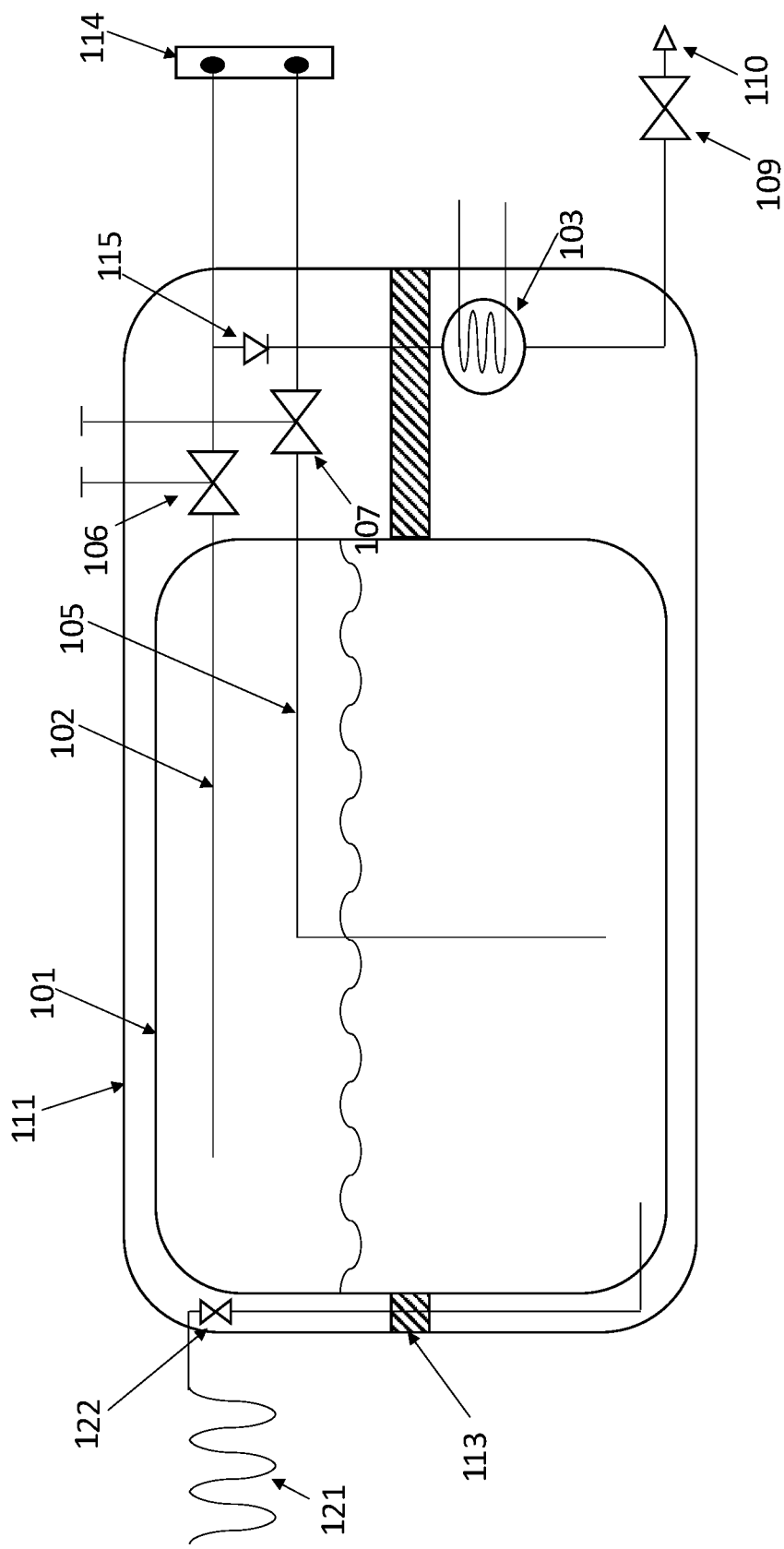
FIG. 4 illustrates a schematic of an alternative embodiment of a storage system according to the invention.

In the embodiment of FIG. 4, in contrast to FIG. 3, the shut-off valve 122 of the pipe 121 is arranged in the vacuum space, that is to say, between the inner container of the storage container 101 and the outer container 111.

Figure 5:
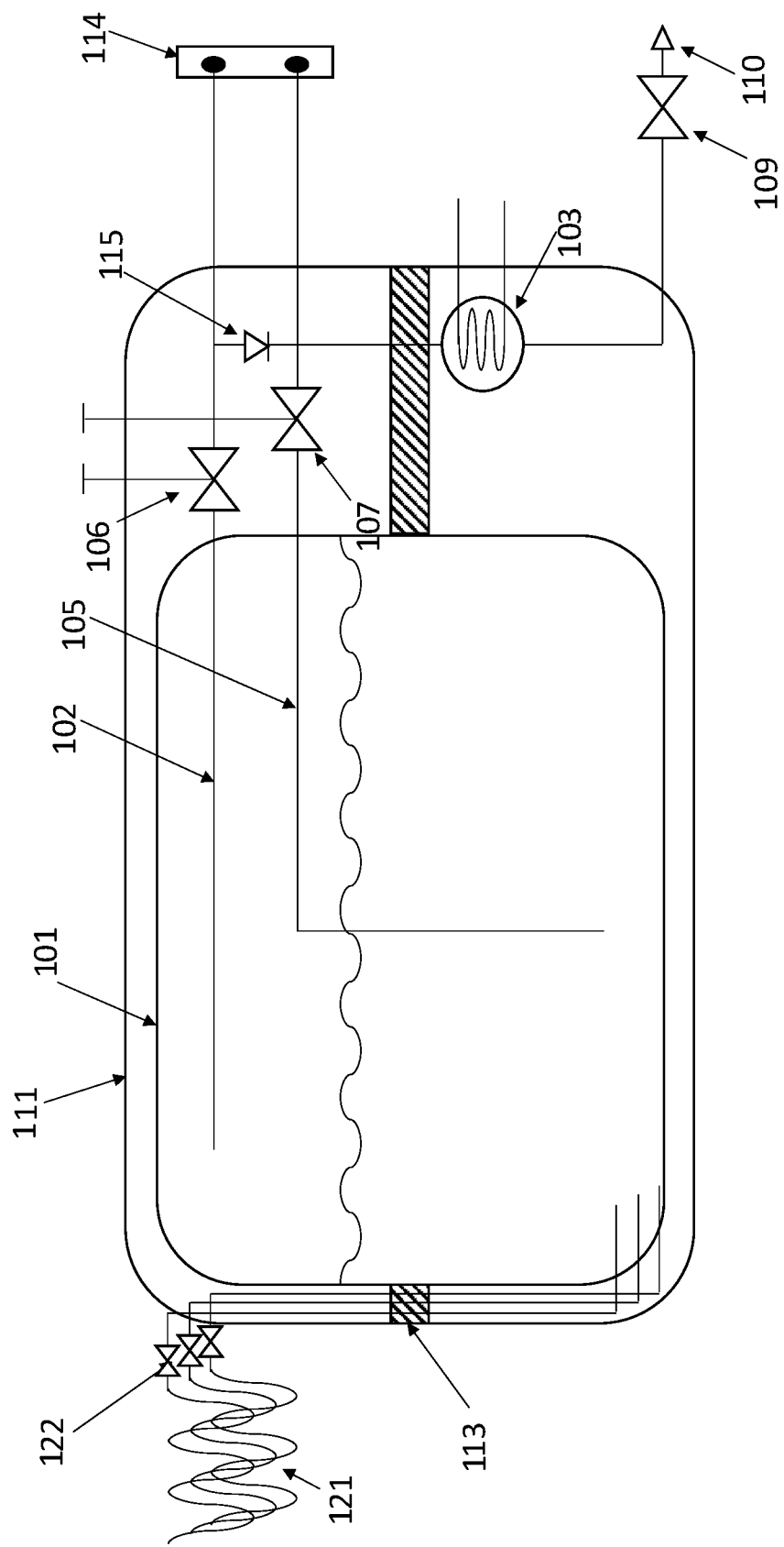
FIG. 5 illustrates a schematic of an alternative embodiment of a storage system, in accordance with embodiments.

FIG. 5 shows that, in order to generate a higher power, the storage system has a plurality of such pipes 121 which are configured to form thermo-acoustic oscillations and which therefore project from outside the storage container 101 into the storage container 1. In FIG. 5, an individual shut-off valve 122 is arranged on each pipe 121. As a result, for example, the thermal power can be controlled by temporary activation of individual valves.

Figure 6:
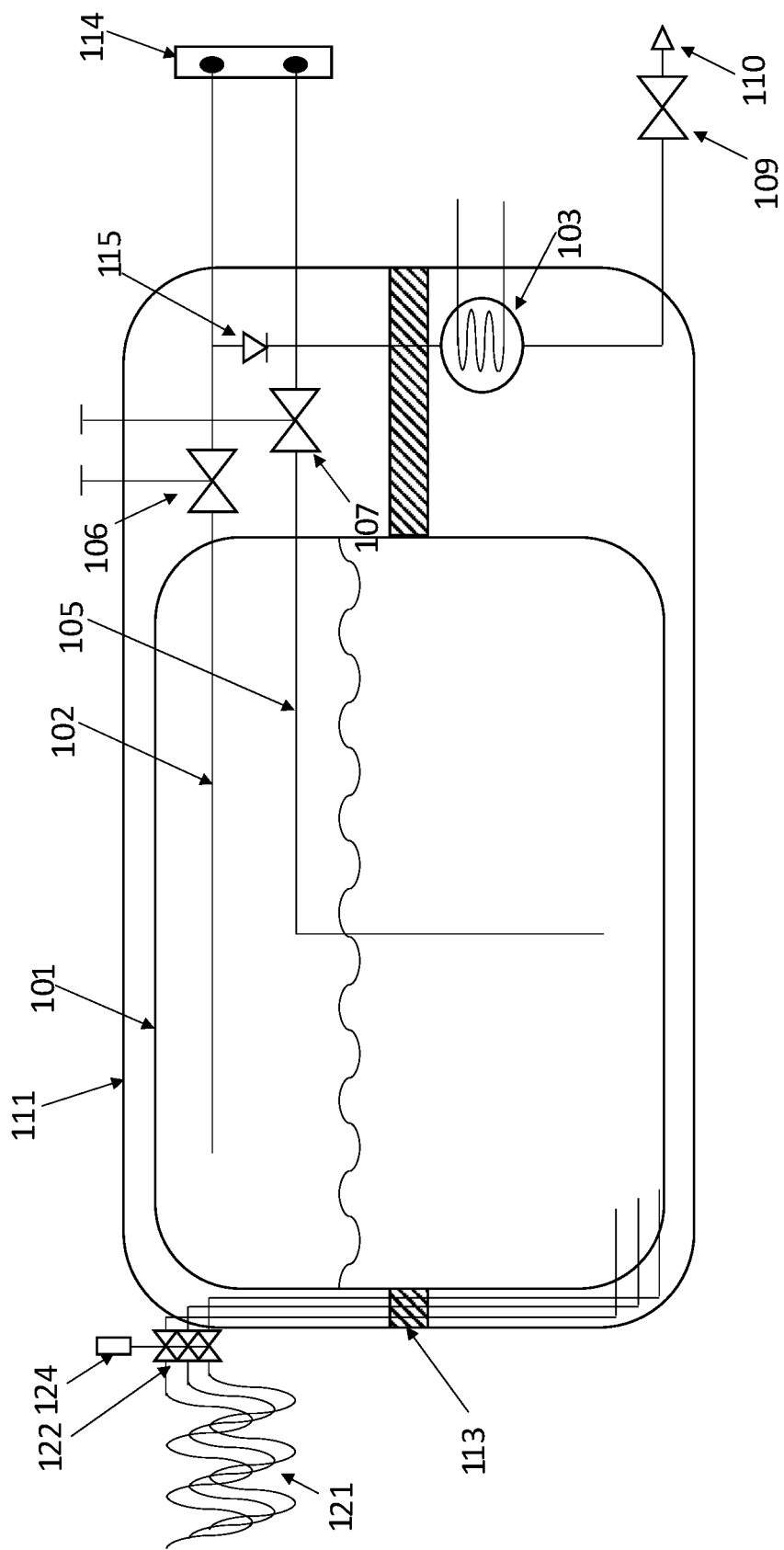
FIG. 6 illustrates a schematic illustration of an alternative embodiment of a storage system, in accordance with embodiments.

The embodiment of FIG. 6 differs from the embodiment of FIG. 5 only in that all the pipes 121 can be opened and closed together via shut-off valves 122 in a common valve block 124. The actuation of the pressure production by the plurality of pipes 121 is thereby simplified.

Figure 7:
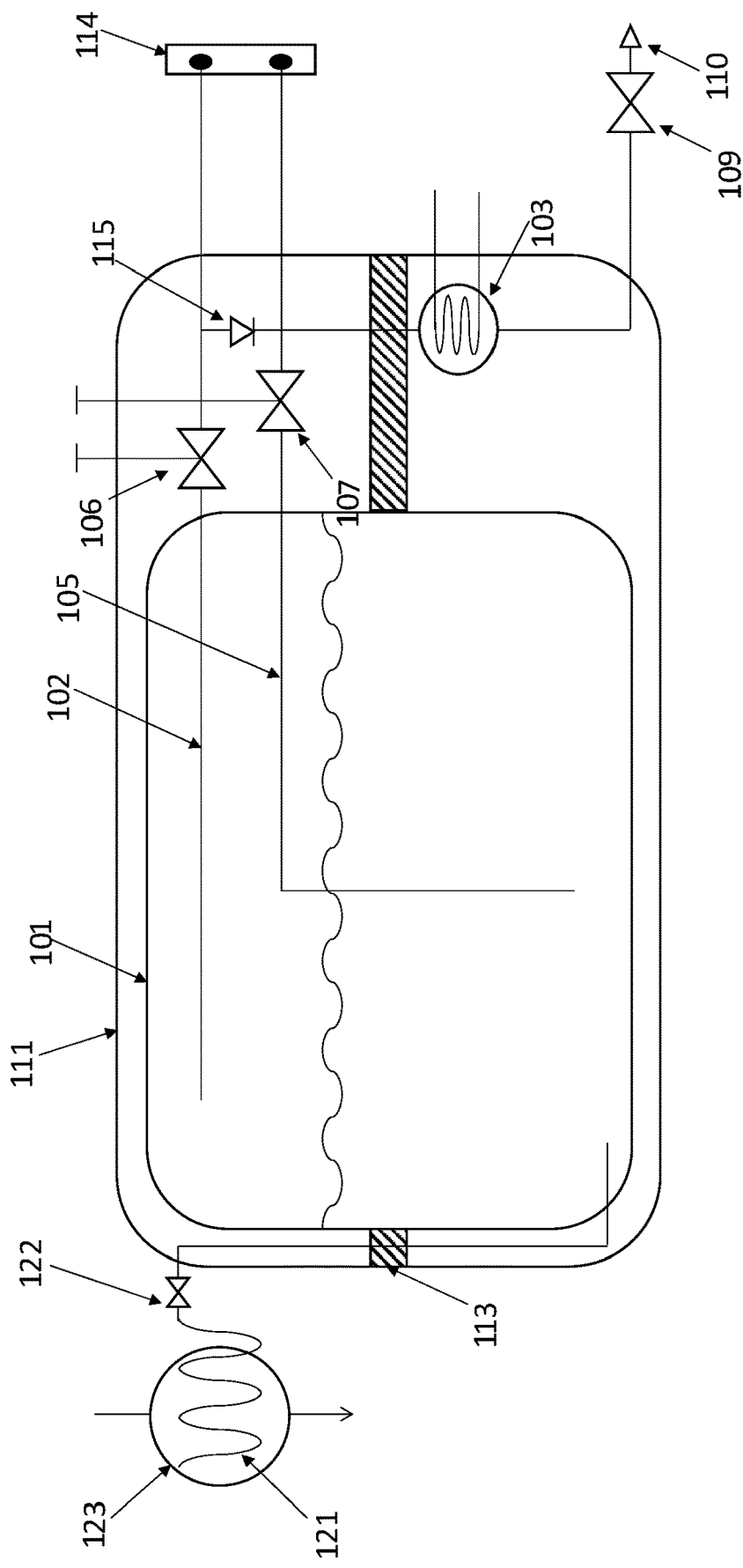
FIG. 7 illustrates a schematic of an alternative embodiment of a storage system, in accordance with embodiments.

In the embodiment of FIG. 7, a heat transmitter 123 is arranged at the end, facing away from the storage container 101, of the pipe 121 in order to transmit heat to the pipe 121, in particular heat from passing air and/or from a cooling fluid.

Figure 8:
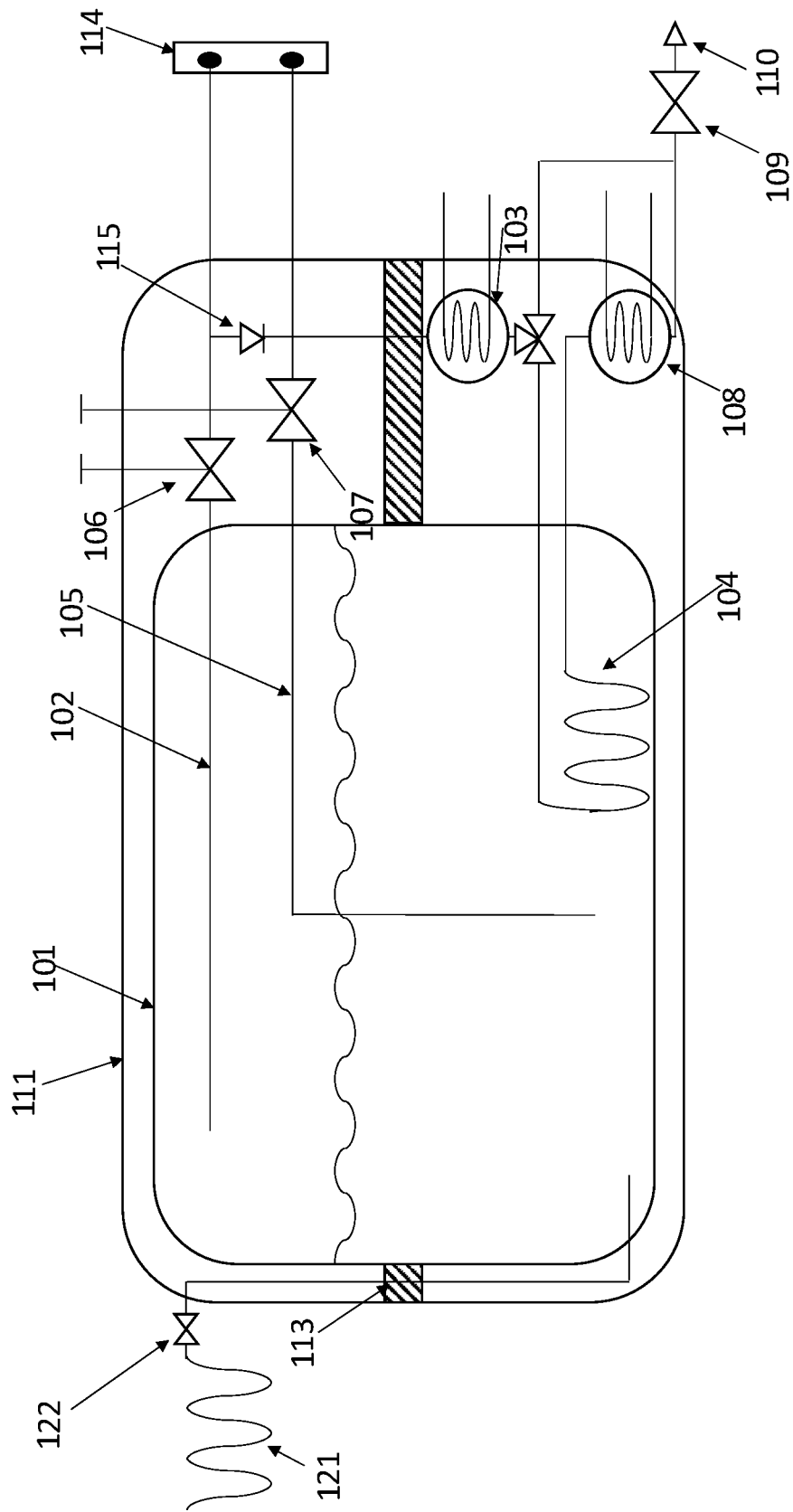
FIG. 8 illustrates a schematic of an alternative embodiment of a storage system, in accordance with embodiments.

Finally, the embodiment according to the invention of FIG. 8 has in addition to the thermo-acoustic pressure production system using the pipe 121 a conventional pressure production system, that is to say, downstream of the first heat exchanger 103 an in-tank heat exchanger 104 which is arranged inside the storage container 101 for heating the fluid medium in the storage container 101 which has medium taken from the storage container 101 flowing through it. As a result of the heating at the in-tank heat exchanger 104, the fluid medium is partially heated and vaporised in the storage container 101. The conventional pressure production system of FIG. 8 consequently substantially corresponds to the one of FIGS. 1 and 2. In this case, the pressure production can be regulated via a part-flow regulating valve 125.

It may be noted that the Figures are illustrated purely schematically and do not have to reproduce the actual size and length relationships.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1, 101 Storage container
2, 102 Gas removal line
3, 103 First heat exchanger
4, 104 In-tank heat exchanger
5, 105 Fluid removal line
6, 106 First controllable line shut-off valve
7, 107 Second controllable line shut-off valve
8, 108 Second heat exchanger
9, 109 Third controllable line shut-off valve
10, 110 Consumer
11, 111 Outer container
13, 113 Mounting
14, 114 Refuelling apparatus
15, 115 Non-return valve
21, 121 Pipe
22, 122 Shut-off valve
23, 123 Heat transmitter
24, 124 Valve block
25, 125 Part-flow regulating valve

What is claimed is:

1. A storage system for storing a cryogenic medium, the storage system comprising:
a storage container to receive a cryogenic medium; and
a thermo-acoustic production system that includes:
at least one thin pipe projecting from outside the storage container into the storage container for closure at an end thereof facing away from the storage container and opening at another end thereof in the storage container; and
a shut-off valve on the at least one thin pipe to regulate pressure in the storage container by being moveable between an open operating state in which the at least one thin pipe is in fluidic communication with the cryogenic medium in the storage container to thereby generate pressure based on thermo-acoustic oscillations in the at least one thin pipe, and a closed operating state in which the at least one thin pipe is not in fluidic communication with the cryogenic medium in of the storage container to thereby prevent thermo-acoustic oscillations in the at least one thin pipe.

2. The storage system of claim 1, wherein the storage container comprises double walls including an inner wall and an outer wall, and an insulating vacuum space between the inner wall and an outer wall.

3. The storage system of claim 2, wherein the end of the at least one thin pipe facing away from the storage container is located outside the insulating vacuum space and the at least one thin pipe extends through the insulating vacuum space and opens in the storage container.

4. The storage system of claim 1, wherein the end of the at least one thin pipe facing away from the storage container comprises at least one heat transfer area having a plurality of pipe ribs to transfer heat from the at least one thin pipe.

5. The storage system of claim 1, wherein the end of the at least one thin pipe facing away from the storage container comprises a heat transmitter to transmit heat to the at least one thin pipe.

6. The storage system of claim 5, wherein the heat transmitter is to transmit heat to the at least one thin pipe by passing air and/or a cooling fluid.

7. The storage system of claim 1, wherein the at least one thin pipe has a maximum internal diameter of 6 mm.

8. The storage system of claim 1, wherein a length of the at least one thin pipe outside the storage container is at least 200 mm.

9. The storage system of claim 8, wherein a ratio of a total length to an internal diameter of the at least one thin pipe is at least 800:1.

10. The storage system of claim 1, wherein the at least one thin pipe comprises a thermal insulation pipe portion arranged in the insulating vacuum space to provide thermally insulation.

11. The storage system of claim 1, wherein a region of the at least one thin pipe arranged inside the storage container has an internal diameter that is less than a region of the at least one thin pipe arranged outside the storage container.

12. The storage system of claim 1, wherein a region of the at least one thin pipe arranged inside the storage container has a diameter that tapers towards a region of the at least one thin pipe arranged outside the storage container.

13. A storage system for storing a cryogenic medium, the storage system comprising:
a storage container to receive the cryogenic medium; and
a thermo-acoustic production system that includes:
a plurality of thin pipes projecting from outside the storage container into the storage container, each thin pipe in the plurality of thin pipes being closed at an end thereof facing away from the storage container and being open at another end thereof located in the storage container; and
a common valve block having a plurality of shut-off valves to regulate pressure in the storage container, each thin pipe in the plurality of thin pipes being in fluidic communication with a corresponding shut-off valve in the plurality of shut-off valves, each corresponding shut-off valve being moveable between an open operating state in which a corresponding thin pipe is in fluidic communication with the cryogenic medium in the storage container to thereby generate pressure based on thermo-acoustic oscillations in the corresponding thin pipe, and a closed operating state in which the corresponding thin pipe is not in fluidic communication with the cryogenic medium in the storage container to thereby prevent thermo-acoustic oscillations in the corresponding thin pipe.

14. The storage system of claim 13, wherein the storage container comprises double walls including an inner wall and an outer wall, and an insulating vacuum space between the inner wall and an outer wall.

15. The storage system of claim 14, wherein the end of each thin pipe that faces away from the storage container is located outside the insulating vacuum space, and each thin pipe respectively extends through the insulating vacuum space and opens in the storage container.

16. The storage system of claim 13, wherein the end of each thin pipe that faces away from the storage container comprises at least one heat transfer area having a plurality of pipe ribs to transfer heat therefrom.

17. The storage system of claim 13, wherein the end of each thin pipe that faces away from the storage container comprises a heat transmitter to transmit heat thereto.

18. The storage system of claim 17, wherein the heat transmitter is to transmit heat to the thin pipe by passing air and/or a cooling fluid.

19. The storage system of claim 13, wherein each thin pipe comprises a thermal insulation pipe portion arranged in the insulating vacuum space to provide thermally insulation.

20. A storage system, comprising:
a storage container to store a cryogenic medium; and
a thermo-acoustic production system that includes:
a plurality of thin pipes projecting from outside the storage container into the storage container; and
a common valve block having a plurality of shut-off valves to regulate pressure in the storage container, each thin pipe in the plurality of pipes being in fluidic communication with a corresponding shut-off valve in the plurality of shut-off valves, each corresponding shut-off valve being moveable between an open operating state in which a corresponding thin pipe is in fluidic communication with the cryogenic medium in the storage container to thereby generate pressure based on thermo-acoustic oscillations in the corresponding thin pipe, and a closed operating state in which the corresponding thin pipe is not in fluidic communication with the cryogenic medium in the storage container to thereby prevent thermo-acoustic oscillations in the corresponding thin pipe.

* * * * *